United States Patent
Yoshida et al.

(10) Patent No.: US 6,765,077 B2
(45) Date of Patent: Jul. 20, 2004

(54) NEGATIVE-CHARGEABILITY CONTROL RESIN

(75) Inventors: Tatsurou Yoshida, Ibaraki (JP); Eri Komatsumoto, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/383,730

(22) Filed: Mar. 10, 2003

(65) Prior Publication Data

US 2003/0191263 A1 Oct. 9, 2003

(30) Foreign Application Priority Data

Mar. 11, 2002 (JP) ........................................ 2002-064742
Dec. 12, 2002 (JP) ........................................ 2002-360119

(51) Int. Cl.⁷ ............................................. C08F 226/02
(52) U.S. Cl. ................... 526/307.6; 526/303.1; 526/307.1; 526/309; 526/317.1; 526/318.2; 526/318.3; 526/330
(58) Field of Search ................... 526/303.1, 307.1, 526/307.6, 309, 317.1, 318.2, 318.3, 330

(56) References Cited

U.S. PATENT DOCUMENTS

| | | |
|---|---|---|
| 2,297,691 A | 10/1942 | Carlson |
| 4,883,735 A | 11/1989 | Watanabe et al. ........... 430/109 |
| 5,212,033 A | 5/1993 | Tsubota et al. ............. 430/106 |
| 5,597,673 A | 1/1997 | Watanabe et al. ............ 430/96 |
| 5,908,723 A * | 6/1999 | Malhotra et al. ............. 430/31 |

FOREIGN PATENT DOCUMENTS

| | | | |
|---|---|---|---|
| EP | 1 176467 A1 | * | 1/2002 |
| JP | 42-23910 | | 11/1967 |
| JP | 43-24748 | | 10/1968 |
| JP | 61-198249 | | 9/1986 |
| JP | 05-170836 | * | 7/1993 |
| JP | 7-72658 | | 3/1995 |
| JP | 8-12467 | | 2/1996 |
| JP | 8-123096 | | 5/1996 |
| JP | 2609358 | | 5/1997 |
| JP | 2623684 | | 6/1997 |
| JP | 9166887 | | 6/1997 |
| JP | 11-100527 | * | 4/1999 |
| JP | 305318 | | 11/2000 |
| JP | 305793 | | 11/2001 |

* cited by examiner

Primary Examiner—Helen L. Pezzuto
(74) Attorney, Agent, or Firm—Fitzpatrick, Cella, Harper & Scinto

(57) ABSTRACT

A negative-chargeability control resin containing a specific vinyl copolymer imparts stable chargeability to toner. The vinyl copolymer is obtainable by copolymerizing a monomer composition which contains at least i) a vinyl monomer (A) as exemplified by N-acryloylmorpholine, N-isopropylacrylamide, N-methylmethacrylamide, N-butoxymethylacrylamide or N-t-butylacrylamide, or a vinyl monomer (B) as exemplified by vinyl butyrate, vinyl 2-ethylhexanoate, vinyl benzoate, vinyl monochloroacetate pivarate, and ii) a vinyl monomer (C) having as a functional group a carboxyl group or a carboxyl group made into salt structure.

11 Claims, 1 Drawing Sheet

FIGURE
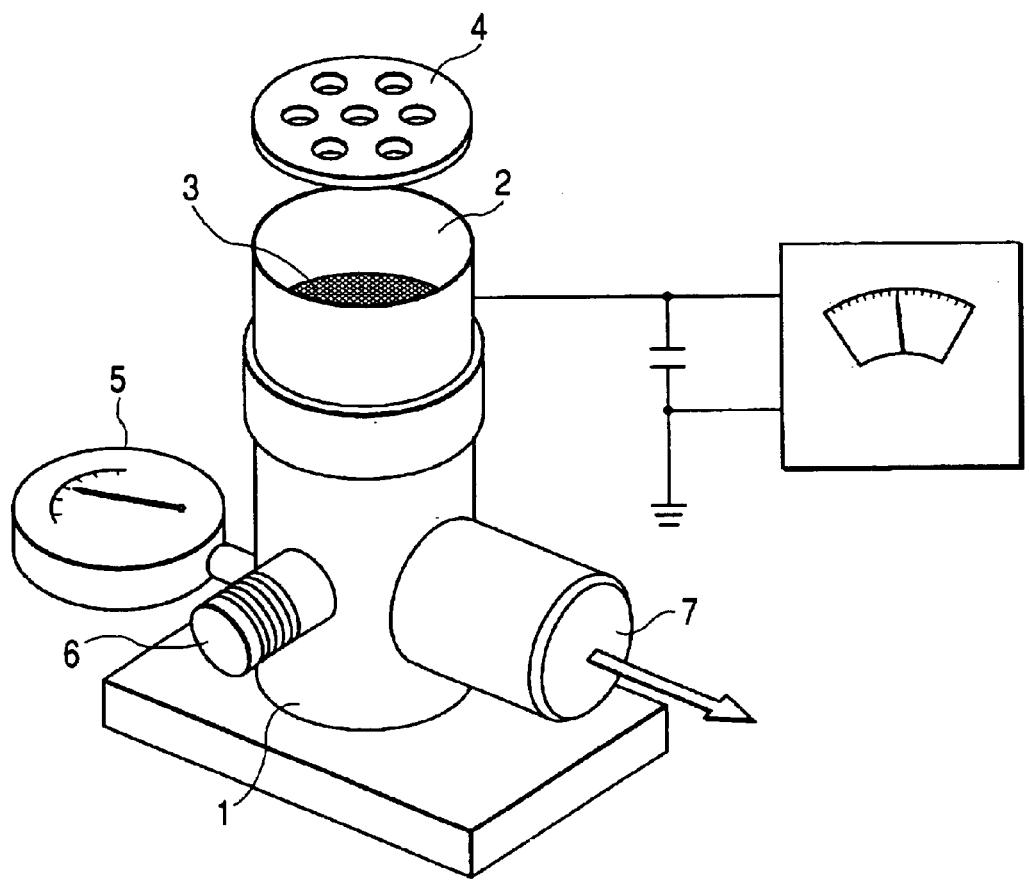

NEGATIVE-CHARGEABILITY CONTROL RESIN

BACKGROUND OF THE INVENTION

1. Field of the Invention

This invention relates to a negative-chargeability control resin for electrophotographic charging toners used when electrostatic latent images are made into visible images in dry-process electrophotography. More particularly, it relates to a negative-chargeability control resin which enables free control of electrostatic charging, may cause no toner scatter when used as a charge control agent and can contribute to formation of images having sharp hues, superior image reproducibility and high density.

2. Related Background Art

A number of methods as disclosed in U.S. Pat. No. 2,297,691, Japanese Patent Publication No. 42-23910 and Japanese Patent Publication No. 43-24748 are conventionally known as methods for electrophotography. As developing systems applied in these electrophotographic processes, they are roughly classified into dry-process developing systems and wet-process developing systems. The former is further classified into a system making use of two-component developers and a system making use of one-component developers.

As toners used in such dry-process developing systems, fine powders of natural or synthetic resins in which dyes or pigments have been dispersed are conventionally used. For example, particles of a binder resin such as polystyrene in which a pigment has been dispersed and which has been pulverized to have particle diameters of from 1 μm to 30 μm are used as a toner. As magnetic toners, those containing magnetic particles such as magnetite are used. In the case of the two-component developers, toners are also usually used in the form of a blend with carrier particles such as iron powder or magnetic ferrite particles.

Toners must electrostatically be charged positively or negatively in accordance with the polarity of the electrostatically charged image to be developed, and charge control agents are added in order to endow the toners with the desired triboelectric chargeability.

As charge control agents for positive triboelectric chargeability, nigrosine dyes, azine dyes, copper phthalocyanine pigments and quaternary ammonium salts or polymers having quaternary ammonium salts are known in the art. As charge control agents for negative triboelectric chargeability, metal complex salts of monoazo dyes and metal complex salts of salicylic acid, naphthoic acid or dicarboxylic acid are known in the art. However, the charge control agents are colored in many cases, and may cause a problem in reproducibility when used in color toners. Thus, chargeability control resins which are almost colorless or not so colored attract notice.

For example, Japanese Patent Application Laid-open No. 63-184762 (Japanese Patent Publication No. 8-12467) discloses a toner which has a binder resin comprised of a copolymer of styrene and/or α-methylstyrene with an acrylic or methacrylic alkyl ester and contains a copolymer of styrene and/or α-methylstyrene with 2-acrylamido-2-methylpropanesulfonic acid.

Japanese Patent Application Laid-open No. 2-167565 (Japanese Patent No. 2623684), Japanese Patent Application Laid-open No. 4-195166 (Japanese Patent No. 2609358), Japanese Patent Application Laid-open No. 7-72658 and Japanese Patent Application Laid-open No. 2000-305318 also disclose chargeability control resins which contain as constituent units acrylamide monomers containing a sulfonic acid group and toners which contain such chargeability control resins.

Japanese Patent Application Laid-open No. 8-123096 discloses a toner having i) a charge control agent containing an iron element and ii) a copolymer of a styrene/acrylic monomer with a sulfonic-acid-containing acrylamide monomer.

However, where such a copolymer of an acrylamide monomer having a sulfonic acid group with any other vinyl monomer is used as the chargeability control resin, the copolymer tends to have non-uniform monomer composition, making it difficult in some cases to endow the toner with stable triboelectric chargeability.

Japanese Patent Application Laid-open No. 9-166887 and Japanese Patent Application Laid-open No. 2001-305793 disclose toners containing a copolymer with a styrene/acrylic monomer having a specific carboxylic acid monomer (succinic-acid monohydroxyethyl methacrylate).

However, as described in these publications, the use of the above copolymer has made it necessary to use a conventionally known charge control agent in combination from the viewpoint of charge-providing performance.

Japanese Patent Application Laid-open No. 61-198249 discloses a toner comprised of a binder resin having as a constituent unit a monomer containing an amino group. This binder resin, however, is a positive-chargeability control resin containing an alkylene group in the monomer, and can not attain any satisfactory charging performance when applied in negatively chargeable toners.

SUMMARY OF THE INVENTION

The present invention is to provide a negative-chargeability control resin having solved the above problems. Accordingly, an object of the present invention is to provide a negative-chargeability control resin improved in uniformity of the copolymer composition constituting the negative-chargeability control resin and can endow the toner with stable charging performance.

That is, the present invention provides a negative-chargeability control resin comprising a vinyl copolymer obtained by copolymerizing a monomer composition which contains at least a vinyl monomer represented by the following formula (1) or (2) and a vinyl monomer having as a functional group a carboxyl group or a carboxyl group made into salt structure:

(1)

wherein $R^1$ represents a hydrogen atom or a methyl group; and $R^2$ and $R^3$ each represent a hydrogen atom or an alkyl group having 1 to 20 carbon atoms which can be substituted with a substituent except for an acid group, or $R^2$ and $R^3$ may combine chemically to form a heterocyclic ring having 4 to 20 carbon atoms, or $R^2$ and $R^3$ may form a cyclic structure having at least one atom selected from the group consisting of a nitrogen atom, an oxygen atom and a sulfur atom and having 4 to 19 carbon atoms; or

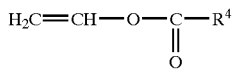

(2)

wherein $R^4$ represents an alkyl group having 1 to 20 carbon atoms, or an aromatic group.

BRIEF DESCRIPTION OF THE DRAWINGS

FIGURE is a schematic view of an instrument used to measure triboelectric charge quantity.

DESCRIPTION OF THE PREFERRED EMBODIMENTS

Studies made by the present inventors have revealed that any negative-chargeability control resin comprised of the copolymer of an acrylamide monomer having a sulfonic acid group has a limited ability to endow a toner with stable triboelectric chargeability to obtain a toner which may suppress fog even in a normal-temperature and low-humidity environment and can exhibit sufficient image density even in a high-temperature and high-humidity environment, and that it is important to copolymerize a monomer component capable of lessening fog and improving the rise of charging (or chargeability rapidness), with a monomer component capable of enhancing the triboelectric charge quantity of the toner.

According to studies made by the present inventors, a vinyl monomer represented by the following formula (1) (hereinafter referred to as "monomer (A)") or a vinyl monomer represented by the following formula (2) (hereinafter referred to as "monomer (B)") has the effect of lessening fog even in a normal-temperature and low-humidity environment and improving the rise of triboelectric charging of toner. It has also been found that the triboelectric charge quantity of toner is remarkably improved by copolymerizing this monomer (A) or (B) with a vinyl monomer having as a functional group a carboxyl group or a carboxyl group made into salt structure (hereinafter called "monomer (C)"). As the monomer (C), a vinyl monomer represented by the following formula (3) or (4) may preferably be used. While the "vinyl monomer" strictly means a monomer having "$CH_2=CH-$", that term referred to herein includes "$CH_2=CR-$ (R: a substituent such as an alkyl group)

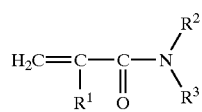

(1)

wherein $R^1$ represents a hydrogen atom or a methyl group; and $R^2$ and $R^3$ each represent a hydrogen atom or an alkyl group having 1 to 20 carbon atoms which can be substituted with a substituent except for an acid group, or $R^2$ and $R^3$ may combine chemically to form a heterocyclic ring having 4 to 20 carbon atoms, or $R^2$ and $R^3$ may form a cyclic structure having at least one atom selected from the group consisting of a nitrogen atom, an oxygen atom and a sulfur atom and having 4 to 19 carbon atoms.

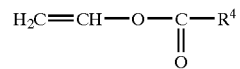

(2)

wherein $R^4$ represents an alkyl group having 1 to 20 carbon atoms, or an aromatic group.

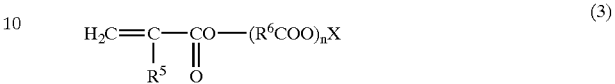

(3)

wherein $R^5$ represents a hydrogen atom or a methyl group; $R^6$ represents an alkylene group having 2 to 6 carbon atoms; n represents an integer of 0 to 10; and X represents a hydrogen atom, an alkali metal, an alkaline earth metal or a quaternary ammonium group.

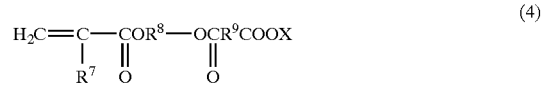

(4)

wherein $R^7$ represents a hydrogen atom or a methyl group; $R^8$ represents an alkylene group having 2 to 4 carbon atoms; $R^9$ represents an ethylene group, a vinylene group or a 1,2-cyclohexylene group; and X represents a hydrogen atom, an alkali metal, an alkaline earth metal or a quaternary ammonium group.

The vinyl copolymer contained in the negative-chargeability control resin of the present invention may preferably be a polymer obtained by polymerization using the monomer (A) or (B) in an amount of from 0.5% by weight to 20% by weight. More preferred is a case in which it is used in an amount of from 1% by weight to 15% by weight. Still more preferred is a case in which it is used in an amount of from 2% by weight to 10% by weight.

The vinyl copolymer contained in the negative-chargeability control resin of the present invention may preferably contain monomer units derived from the monomer (A) or (B), in an amount of from 0.5% by weight to 20% by weight. More preferred is a case in which it contains the same in an amount of from 1% by weight to 15% by weight. Still more preferred is a case in which it contains the same in an amount of from 2% by weight to 10% by weight. If the monomer units derived from the monomer (A) or (B) are in an amount less than 0.5% by weight, the rise of triboelectric charging may be slow. If the amount is more than 20% by weight, the triboelectric charge quantity tends to be insufficient.

In the negative-chargeability control resin of the present invention, the monomer (A) may include, e.g., (meth)acrylamide; N-substituted (meth)acrylamides such as N,N-dimethyl (meth)acrylamide, N-methyl (meth)acrylamide, N-isopropyl (meth)acrylamide, N-butoxymethyl (meth)acrylamide, N-t-butyl (meth)acrylamide, N-phenyl (meth)acrylamide and N-methylol (meth)acrylamide; (meth)acrylamides containing cyclic structure, such as N-(meth)acryloylmorpholine, N-(meth)acryloylpyrrolidone, N-(meth)acryloylpiperidine, N-(meth)acryloylpyrrolidine and N-(meth)acryloyl-4-piperidone. Two or more types of monomers may also be copolymerized.

In the negative-chargeability control resin of the present invention, the monomer (B) may include, e.g., vinyl acetate, vinyl propionate, vinyl butyrate, vinyl caproate, vinyl caprylate, vinyl caprate, vinyl laurate, vinyl mylistate, vinyl palmitate, vinyl stearate, vinyl pivarate, vinyl 2-ethyl hexanoate, vinyl cyclohexane carboxylate, vinyl monochloroacetate, vinyl benzoate and vinyl cinnamate. Two or more types of monomers may also be copolymerized.

In the negative-chargeability control resin of the present invention, the monomer (C) may include, e.g., maleic acid, half-esterified products of maleic acid, fumaric acid, half-esterified products of fumaric acid, itaconic acid, half-esterified products of itaconic acid, crotonic acid and cinnamic acid. More preferred is a case in which the vinyl monomer represented by the formula (3) or (4) is used. The addition of these vinyl monomers brings about an improvement in the rise of triboelectric charging of the toner.

The vinyl copolymer contained in the negative-chargeability control resin of the present invention may preferably be a polymer obtained by polymerization using the monomer (C) in an amount of from 1% by weight to 20% by weight. More preferred is a case in which it is used in an amount of from 2% by weight to 15% by weight. Still more preferred is a case in which it is used in an amount of from 3% by weight to 10% by weight.

The vinyl copolymer contained in the negative-chargeability control resin of the present invention may preferably contain monomer units derived from the monomer (C), in an amount of from 1% by weight to 20% by weight. More preferred is a case in which it contains the same in an amount of from 2% by weight to 15% by weight. Still more preferred is a case in which it contains the same in an amount of from 3% by weight to 10% by weight. If the amount is less than 1% by weight, the toner tends to have insufficient triboelectric charge quantity. If the amount is more than 20% by weight, the negative-chargeability control resin tends to be dispersed in toner particles in a non-uniform state.

The proportion of content of each monomer in the negative-chargeability control resin of the present invention may be measured by conventionally known measuring methods.

For example, as to the vinyl monomer having as a functional group a carboxyl group or a carboxyl group made into salt structure, its proportion of content may be measured by neutralization titration reaction. Also, as to the vinyl copolymer represented by the formula (1), its proportion of content may be measured by nitrogen content measurement as long as the other monomers and a polymerization initiator do not contain any nitrogen atom. Where the monomer has a functional group showing a characteristic chemical shift, its proportion of content may be measured by NMR. The proportion of content of the monomer represented by the formula (2) may be found by indirect calculation after the proportion of content of the other monomers has been measured.

In the negative-chargeability control resin of the present invention, the vinyl monomer represented by the formula (3) may preferably be one in which the X in the formula is a hydrogen atom, having a carboxyl group, and may include e.g., (meth)acrylic acid, (meth)acrylic acid dimer, ω-carboxy-polycaprolactone mono(meth)acrylate. Two or more types of monomers may also be used.

In the negative-chargeability control resin of the present invention, the vinyl monomer represented by the formula (4) may preferably be one in which the X in the formula is a hydrogen atom, having a carboxyl group. Such a vinyl monomer includes succinic-acid monohydroxyethyl (meth)acrylate, maleic-acid monohydroxyethyl (meth)acrylate, fumaric-acid monohydroxyethyl (meth)acrylate, phthalic-acid monohydroxyethyl (meth)acrylate and 1,2-dicarboxycyclohexane monohydroxyethyl (meth)acrylate. Two or more types of monomers may also be used.

In the negative-chargeability control resin of the present invention, as a copolymerization component of the monomer (A) or (B) and monomer (C), it may include styrene; styrene derivatives such as α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene and p-phenylstyrene; acrylate type monomers such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate and 2-benzoyloxyethyl acrylate; methacrylate type monomers such as methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate and dibutyl phosphate ethyl methacrylate; methylene aliphatic monocarboxylates; vinyl esters such as vinyl acetate, vinyl propionate, vinyl butyrate, vinyl benzoate and vinyl formate; vinyl ethers such as methyl vinyl ether, ethyl vinyl ether and isobutyl vinyl ether; and vinyl ketones such as methyl vinyl ketone, hexyl vinyl ketone and isopropyl vinyl ketone. Any of these may be used alone or in combination. In particular, styrene is preferred in view of such advantages that it is inexpensive, has good copolymerizability with other vinyl monomers, enables the Tg (glass transition temperature) of the copolymer to be easily adjusted and can attain superior dispersibility in the toner. In addition, in the vinyl copolymer contained in the negative-chargeability control resin, units derived from styrene may preferably be contained in an amount of 60% by weight or more, and particularly 70% by weight or more.

The negative-chargeability control resin of the present invention is comprised of the vinyl copolymer, and may also contain other component(s) as, long as the effect attributable to the former is not lowered.

The vinyl copolymer contained in the negative-chargeability control resin of the present invention may preferably have a weight-average molecular weight (Mw) of from 2,000 to 200,000. More preferred is a case in which it has the Mw of from 5,000 to 100,000. Still more preferred is a case in which it has the Mw of from 8,000 to 50,000. If it has a weight-average molecular weight (Mw) of less than 2,000 or more than 200,000, the negative-chargeability control resin tends to be dispersed in toner particles in a non-uniform state when added to the toner, resulting in insufficient triboelectric charge quantity of the toner in some cases.

The vinyl copolymer contained in the negative-chargeability control resin of the present invention may preferably have a glass transition temperature (Tg) of from 30° C. to 120° C. More preferred is a case in which it has the Tg of from 50° C. to 110° C. Still more preferred is a case in which it has the Tg of from 60° C. to 100° C. If it has a glass transition temperature (Tg) lower than 30° C. or higher than 120° C., the negative-chargeability control resin tends to be dispersed in toner particles in a non-uniform state when added to the toner, and the toner may have insufficient triboelectric charge quantity.

The vinyl copolymer contained in the negative-chargeability control resin of the present invention may preferably have an acid value of from 1 mg·KOH/g to 70 mg·KOH/g. More preferred is a case in which it has an acid value of from 5 mg·KOH/g to 50 mg·KOH/g. Still more preferred is a case in which it has an acid value of from 10 mg·KOH/g to 40 mg·KOH/g. If the negative-chargeability control resin has an acid value of less than 1 mg·KOH/g, the toner tends to have insufficient triboelectric charge quantity. If it has an acid value of more than 70 mg·KOH/g, the negative-chargeability control resin tends to be dispersed in toner particles in a non-uniform state, and the toner may have insufficient triboelectric charge quantity.

Polymerization methods for obtaining the negative-chargeability control resin of the present invention may include, but are not particularly-limited to, bulk polymerization, solution polymerization, emulsion polymerization and suspension polymerization. In view of such an advantage that the reaction can readily be controlled, solution polymerization is preferred. Solvents therefor may include, but are not particularly limited to, xylene, toluene, ethyl acetate, isobutyl acetate, isopropyl alcohol, methanol, methyl ethyl ketone, methyl isobutyl ketone, N,N-dimethylformamide and dimethylformamide. As to the proportion of the solvent to the monomers, there are no particular limitations, and the polymerization may preferably be carried out using the monomers in an amount of from 30 parts by weight to 400 parts by weight based on 100 parts by weight of the solvent.

The polymerization initiator used to obtain the negative-chargeability control resin of the present invention by the polymerization may include, but is not particularly limited to, t-butylperoxy-2-ethylhexanoate, cumyl perpivalate, t-butyl peroxylaurate, benzoyl peroxide, lauroyl peroxide, octanoyl peroxide, di-t-butyl peroxide, t-butylcumyl peroxide, dicumyl peroxide, 2,2'-azobisbutyronitrile, 2,2'-azobis(2-methylbutyronitrile), 2,2'-azobis(2,4-dimethylvaleronitrile), 2,2'-azobis(4-methoxy-2,4-dimethylvaleronitrile), and dimethyl 2,2'-azobis (2-methylpropionate). Any of these may used alone or in combination.

The polymerization initiator may be used in an amount of from 0.05 part by weight to 30 parts by weight, and preferably from 0.1 part by weight to 15 parts by weight, based on 100 parts by weight of the monomers. The reaction may preferably be carried out at a temperature of from 40° C. to 150° C. The temperature is not particularly limited thereto and may be set in accordance with the solvent, polymerization initiator and monomers to be used.

As binder resins for negatively triboelectrically chargeable toners to which the negative-chargeability control resin of the present invention is to be added, all known resins may be used, which may include, e.g., polystyrene, polychlorostyrene, poly-a-methylstyrene, a styrene-chlorostyrene copolymer, a styrene-propylene copolymer, a styrene-butadiene copolymer, a styrene-vinyl chloride copolymer, a styrene-vinyl acetate copolymer, a styrene-maleic acid copolymer, styrene-acrylate copolymers (e.g., a styrene-methyl acrylate copolymer, a styrene-ethyl acrylate copolymer, a styrene-butyl acrylate copolymer, a styrene-octyl acrylate copolymer and a styrene-2-ethylhexyl acrylate copolymer), styrene-methacrylate copolymers (e.g., a styrene-methyl methacrylate copolymer, a styrene-ethyl methacrylate copolymer, a styrene-butyl methacrylate copolymer and a styrene-phenyl methacrylate copolymer), a styrene-methyl α-chloroacrylate copolymer, a styrene-acrylonitrile-acrylate copolymer, vinyl chloride resins, rosin-modified maleic-acid resins, phenolic resins, epoxy resins, polyester resins, low-molecular-weight polyethylene, low-molecular-weight polypropylene, ionomer resins, polyurethane resins, silicone resins, ketone resins, an ethylene-ethyl acrylate copolymer, xylene resins, and polyvinyl butyral resins. Particularly preferred resins may include styrene resins, polyester resins, silicone resins and epoxy resins. Any of the above resins may be used alone or in combination with no limitation.

Colorants for negatively triboelectrically chargeable toners to which the negative-chargeability control resin of the present invention is to be added may include any suitable pigments or dyes conventionally known as colorants for toners. They are exemplified by carbon black, aniline black, acetylene black, Naphthol Yellow, Hanza Yellow, Quinoline Yellow, Fast Yellow G, Benzidine Yellow, Malachite Green, Phthalocyanine Green, Brilliant Green, Rhodamine Lake, Alizarine Lake, red iron oxide, Permanent Red, Irgazine Red, Toluidine Red, Phthalocyanine Blue, Indanethrene Blue, Aniline Blue and Ultramarine Blue.

In the negatively triboelectrically chargeable toners to which the negative-chargeability control resin of the present invention is to be added, any charge control agent need not be used, but may be used. The usable charge control agent may include metal complex salts of monoazo dyes, metal complex salts of salicylic acid, naphthoic acid or dicarboxylic acid, and copper phthalocyanine pigments.

As for waxes of the negatively triboelectrically chargeable toners to which the negative-chargeability control resin of the present invention is to be added, there are no particular limitations. Waxes which are preferably usable may include. e.g., polyolefins obtained by radical-polymerizing olefins under high pressure; polyolefins obtained by purifying low-molecular-weight by-products formed at the time of the polymerization of high-molecular-weight polyolefins; polyolefins obtained by polymerization under low pressure in the presence of a catalyst such as a Ziegler catalyst or a metallocene catalyst; polyolefins obtained by polymerization utilizing radiations, electromagnetic waves or light; low-molecular-weight polyolefins obtained by thermal decomposition of high-molecular weight polyolefins; paraffin wax, microcrystalline wax, and Fischer-Tropsh wax; synthetic hydrocarbon waxes obtained by the Synthol method, the Hydrocol process or the Arge process; synthetic waxes comprised, as a monomer, of a compound having one carbon atom; hydrocarbon waxes having a functional group such as a hydroxyl group or a carboxyl group; mixtures of hydrocarbon waxes and waxes having a functional group; and modified waxes obtained by grafting to any of these waxes serving as a matrix, vinyl monomers such as styrene, maleate, acrylate, methacrylate or maleic anhydride.

To the negatively triboelectrically chargeable toners to which the negative-chargeability control resin of the present invention is to be added, known external additives may be added in order to control their fluidity and developing performance. As the external additives, various fine inorganic oxide particles of silica, alumina, titania (optionally subjected to hydrophobicity treatment) or the like may be used.

As to methods for adding the negative-chargeability control resin of the present invention and producing the negatively triboelectrically chargeable toners, there are no particular limitations. For example, a pulverization toner may be produced by thoroughly mixing the negative-chargeability control resin of the present invention, the binder resin, the dye or pigment (or a magnetic material or carbon black) as a colorant and optionally other additives by means of a mixing machine such as a Henschel mixer or a ball mill, and then melt-kneading the resultant mixture by means of a heat kneading machine such as a heat roll, a kneader or an extruder to melt and disperse the resins and so forth one another, followed by cooling for solidification and thereafter pulverization and classification to obtain toner particles, to which an external additive such as silica or alumina particles may be added by means of a mixing machine such as a Henschel mixer to obtain the toner. A polymerization toner may also be produced by suspending the negative-chargeability control resin of the present invention, the colorant, the monomers, the wax (as needed), the polymerization initiator and so forth in a aqueous system having a dispersant, to effect granulation to obtain dispersed particles having a stated particle size distribution, and thereafter heating the system to carry out polymerization to obtain polymerization toner particles, followed by washing and then drying, and thereafter addition of an external additive such as silica particles.

EXAMPLES

The present invention is described below in greater detail by giving working examples. The present invention is by no means limited by these working examples.

First, specific compounds A1 to A5 of the monomer (A), specific compounds B1 to B5 of the monomer (B) and specific compounds C1 to C5 of the monomer (C) which are used in Examples given later are shown below.

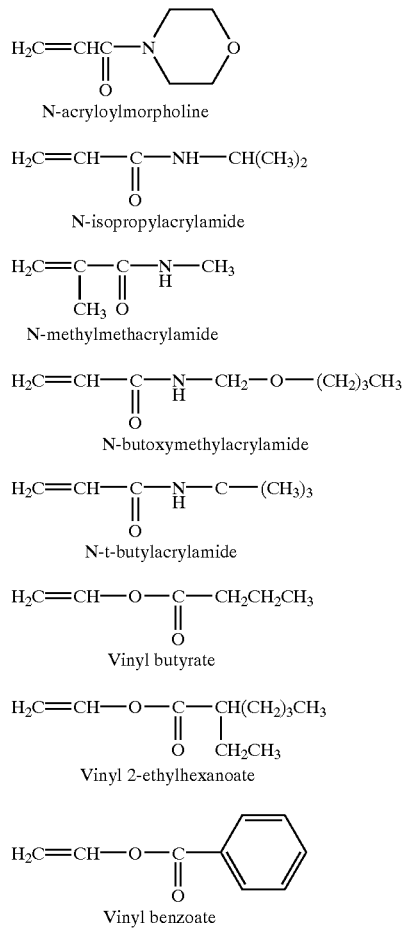

-continued

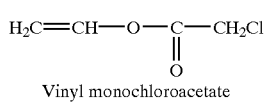

Vinyl monochloroacetate (B4)

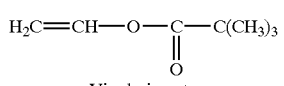

Vinyl pivarate (B5)

$H_2C=CHCOOH$ (C1)
Acrylic acid $H_2C=CHCOO(CH_2CH_2COO)_nH$ (C2)
Acrylic-acid dimer

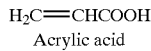 (C3)

Succinic-acid monohydroxyethyl acrylate

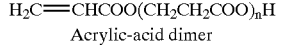 (C4)

Phthalic-acid monohydroxyethyl methacrylate

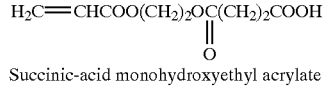 (C5)

Succinic-acid monohydroxyethyl methacrylate

Example 1

Production of Negative-Chargeability Control Resin (CCR1)

Into a four-necked separable flask having a stirrer, a condenser, a thermometer and a nitrogen feed pipe, styrene, N-acryloylmorpholine (A1) and acrylic-acid dimer (C2) were introduced in the amounts shown in Table 1. Then, as solvents 60 g of toluene and 20 g of methanol and as a polymerization initiator 4.0 g of dimethyl 2,2'-azobis(2-methyl propionate) were further introduced thereinto, followed by stirring to carry out solution polymerization under the feeding of nitrogen and in the state of reflux. Thereafter, the product obtained was dried under reduced pressure to obtain a negative-chargeability control resin CCR1. The CCR1 obtained was in a weight corresponding to 98% of the amount of monomers shown in Table 1. Thus, the proportion of monomer units of the CCR1 obtained can be deemed to be equal to the proportion of monomers introduced.

The acid value, weight-average molecular weight (Mw) and glass transition temperature (Tg) of the CCR1 obtained were measured with a full-automatic titrator (manufactured by Kyoto Denshi Kogyo K.K.), by GPC (gel permeation chromatography) measurement (instrument: HLC-8120GPC, manufactured by Tosoh Corporation; columns: manufactured by Showa Denko K.K.) and by DSC measurement (instrument: DSC6200, manufactured by Seiko Instruments Co., Ltd.), respectively. The results are shown in Table 2.

Measurement of Triboelectric Charge Quantity:

The CCR1 obtained was pulverized and then classified to obtain fine powder with an average particle diameter of 3 μm. Then, 20 g of a styrene-butyl acrylate copolymer pulverized to have an average particle diameter of 10.0 μm and 0.2 g of the above fine powder (CCR1) were put into a coffee mill and blended for 1 minute. Using the sample thus prepared and using the instrument shown in Figure, the triboelectric charge quantity was measured in the following way.

0.2 g of the sample thus prepared and 10 g of an iron powder carrier were blended, followed by shaking for two minutes to charge the sample triboelectrically. This was put in a measuring container 2 made of a metal at the bottom of which a screen 3 of 400 meshes (changeable to a size not allowing carrier particles to pass through) was provided, and the container was covered with a lid 4 made of a metal. The weight of the whole measuring container at this point was weighed and was represented by $W_1$ (g). Next, in a suction device 1 (made of an insulating material at least at the part coming into contact with the measuring container 2), air was sucked from a suction opening 7 and an air-flow control valve 6 was so adjusted that the pressure indicated by a vacuum indicator 5 comes to 1.5 kPa. Then, suction was carried out to remove fine powder of the styrene-butyl acrylate copolymer and CCR1. After the suction, electric charges were measured, and the measured value was represented by Q ($\mu$C). The weight of the whole measuring container after the suction was also weighed and was represented by $W_2$ (g). The triboelectric charge quantity was calculated according to the following expression.

Triboelectric charge quantity (mC/kg)=$Q/(W_1-W_2)$

The above measurement of triboelectric charge quantity was made in an N/N (normal-temperature and normal-humidity) environment (22° C., 55% RH). The results are shown in Table 2.

Image Test:

2,500 g of a binder resin (styrene-butyl acrylate copolymer), 50 g of CCR1 as the negative-chargeability control resin and 100 g of Phthalocyanine Blue were kneaded, followed by pulverization and classification to obtain toner particles. To the toner particles obtained, 2% of hydrophobic silica was externally added to obtain a cyan toner. Using the cyan toner obtained and using as an image-forming apparatus a full-color copying machine CLC1130, manufactured by CANON INC., images were formed in an N/N environment to conduct a running (extensive operation) test to evaluate image characteristics of initial-stage images and images after copying on 5,000 sheets. With regard to fog, the whiteness of image white-background areas at the running initial stage and after running was measured with a reflection densitometer TC-6DS/A (manufactured by Tokyo Denshoku K.K.). From the difference between this whiteness and the whiteness of plain paper (transfer paper), fog density was calculated to make evaluation according to the following evaluation criteria. The evaluation results are shown in Table 3.

Evaluation of Image Density:

A: 1.4 or more.
B: 1.3 or more and less than 1.4.
C: 1.2 or more and less than 1.3.
D: Less than 1.2.

Evaluation on Fog:

A: Very good (less than 2.0%).
B: Good (2.0% or more and less than 3.0%).
C: Poor (3.0% or more).

Examples 2 and 3

Production of CCR2 and CCR3

CCR2 and CCR3 were obtained in the same manner as in Example 1 except that the styrene and the N-acryloylmorpholine (A1) were introduced in the amounts as shown in Table 1. The acid value, Mw, Tg and triboelectric charge quantity of the CCR2 and CCR3 obtained were each measured in the same manner as in Example 1. The results are shown in Table 2. Image formation tests were also conducted in the same manner as in Example 1 to evaluate images of the cyan toner containing the CCR2 or CCR3 and to evaluate fog. The results are shown in Table 3.

Example 4

Production of CCR4

CCR4 was obtained in the same manner as in Example 1 except that styrene, N-isopropylacrylamide (A2) and succinic-acid monohydroxyethyl acrylate (C3) were introduced in the amounts shown in Table 1 and dimethyl 2,2'-azobis(2-methyl propionate) in an amount of 3.1 g. The acid value, Mw, Tg and triboelectric charge quantity of the CCR4 obtained were each measured in the same manner as in Example 1. The results are shown in Table 2. An image formation test was also conducted in the same manner as in Example 1 to evaluate images of the cyan toner containing the CCR4 and evaluate fog. The results are shown in Table 3.

Examples 5 to 7

Production of CCR5 to CCR7

CCR5 to CCR7 were obtained in the same manner as in Example 4 except that the styrene and the succinic-acid monohydroxyethyl acrylate (C3) were introduced in the amounts as shown in Table 1. The acid value, Mw, Tg and triboelectric charge quantity of the CCR5 to CCR7 obtained were each measured in the same manner as in Example 1. The results are shown in Table 2. Image formation tests were also conducted in the same manner as in Example 1 to evaluate images of the cyan toner containing the CCR5, CCR6 or CCR7 and to evaluate fog. The results are shown in Table 3.

Examples 8 and 9

Production of CCR8 and CCR9

CCR8 and CCR9 were obtained in the same manner as in Example 4 except that styrene, 2-ethylhexyl acrylate, N-methylmethacrylamide (A3) and acrylic acid (C1) were introduced in the amounts shown in Table 1. The acid value, Mw, Tg and triboelectric charge quantity of the CCR8 and CCR9 obtained were each measured in the same manner as in Example 1. The results are shown in Table 2. Image formation tests were also conducted in the same manner as in Example 1 to evaluate images of the cyan toner containing the CCR8 or CCR9 and to evaluate fog. The results are shown in Table 3.

Example 10

Production of CCR10

CCR10 was obtained in the same manner as in Example 4 except that styrene, N-methylmethacrylamide (A3) and acrylic acid (C1) were introduced in the amounts shown in Table 1. The acid value, Mw, Tg and triboelectric charge quantity of the CCR10 obtained were each measured in the same manner as in Example 1. The results are shown in Table 2. An image formation test was also conducted in the same manner as in Example 1 to evaluate images of the cyan toner containing the CCR10 and evaluate fog. The results are shown in Table 3.

Example 11

Production of CCR11

CCR11 was obtained in the same manner as in Example 4 except that vinyltoluene, N-methylmethacrylamide (A3) and acrylic acid (C1) were introduced in the amounts shown in Table 1. The acid value, Mw, Tg and triboelectric charge quantity of the CCR11 obtained were each measured in the same manner as in Example 1. The results are shown in Table 2. An image formation test was also conducted in the same manner as in Example 1 to evaluate images of the cyan toner containing the CCR11 and to evaluate fog. The results are shown in Table 3.

Example 12

Production of CCR12

CCR12 was obtained in the same manner as in Example 1 except that styrene, N-butoxymethylacrylamide (A4) and acrylic-acid dimer (C2) were introduced in the amounts shown in Table 1 and 2,2'-azobis(2-methyl propionate) was used in an amount of 12.5 g. The acid value, Mw, Tg and triboelectric charge quantity of the CCR12 obtained were each measured in the same manner as in Example 1. The results are shown in Table 2. An image formation test was also conducted in the same manner as in Example 1 to evaluate images of the cyan toner containing the CCR12 and to evaluate fog. The results are shown in Table 3.

Example 13

Production of CCR13

CCR13 was obtained in the same manner as in Example 1 except that styrene, N-butoxymethylacrylamide (A4) and acrylic-acid dimer (C2) were introduced in the amounts shown in Table 1 and 2,2'-azobis(2-methyl propionate) was used in an amount of 4.5 g. The acid value, Mw, Tg and triboelectric charge quantity of the CCR13 obtained were each measured in the same manner as in Example 1. The results are shown in Table 2. An image formation test was also conducted in the same manner as in Example 1 to evaluate images of the cyan toner containing the CCR13 and to evaluate fog. The results are shown in Table 3.

Example 14

Production of CCR14

CCR14 was obtained in the same manner as in Example 1 except that styrene, N-butoxymethylacrylamide (A4) and acrylic-acid dimer (C2) as a carboxyl-group-containing vinyl monomer were introduced in the amounts shown in Table 1 and 2,2'-azobis(2-methyl propionate) was used in an amount of 3.1 g. The acid value, Mw, Tg and triboelectric charge quantity of the CCR14 obtained were each measured in the same manner as in Example 1. The results are shown in Table 2. An image formation test was also conducted in the same manner as in Example 1 to evaluate images of the cyan toner containing the CCR14 and to evaluate fog. The results are shown in Table 3.

Example 15

Production of CCR15

CCR15 was obtained in the same manner as in Example 1 except that styrene, N-butoxymethylacrylamide (A4) and acrylic-acid dimer (C2) were introduced in the amounts shown in Table 1 and 2,2'-azobis(2-methyl propionate) was used in an amount of 2.0 g. The acid value, Mw, Tg and triboelectric charge quantity of the CCR15 obtained were each measured in the same manner as in Example 1. The results are shown in Table 2. An image formation test was also conducted in the same manner as in Example 1 to evaluate images of the cyan toner containing the CCR15 and to evaluate fog. The results are shown in Table 3.

Example 16

Production of CCR16

Into a four-necked separable flask having a stirrer, a condenser, a thermometer and a nitrogen feed pipe, styrene, N-butoxymethylacrylamide (A4) and acrylic-acid dimer (C2) were introduced in the amounts shown in Table 1 and further 0.7 g of benzoyl peroxide was added to mix and dissolve it. An aqueous solution composed of 3 g of tricalcium phosphate, 0.3 g of sodium lauryl sulfate and 210 g of deionized water was added to carry out stirring and granulation. After the granulation, the system was heated to 80° C. with stirring to carry out polymerization reaction for 6 hours, and thereafter heated to 90° C. to carry out polymerization reaction for 4 hours. Thereafter, filtration, water washing, acid washing and water washing were carried out, followed by drying to obtain CCR16.

The acid value, Mw, Tg and triboelectric charge quantity of the CCR16 obtained were each measured in the same manner as in Example 1. The results are shown in Table 2. An image formation test was also conducted in the same manner as in Example 1 to evaluate images of the cyan toner containing the CCR16 and to evaluate fog. The results are shown in Table 3.

Example 17

Production of CCR17

CCR17 was obtained in the same manner as in Example 1 except that styrene, N-butylacrylamide (A5) and phthalic-acid monohydroxyethyl methacrylate (C4) were introduced in the amounts shown in Table 1. The acid value, Mw, Tg and triboelectric charge quantity of the CCR17 obtained were each measured in the same manner as in Example 1. The results are shown in Table 2.

An image formation test test was conducted in the same manner as the test in Example 1 except that the Phthalocyanine Blue was changed for carbon black, to evaluate images of a black toner containing the CCR17 and to evaluate fog. The results are shown in Table 3.

Example 18

Production of CCR18

CCR18 was obtained in the same manner as in Example 1 except that styrene, N-acryloylmorpholine (A1) and succinic-acid monohydroxyethyl methacrylate (C5) were introduced in the amounts shown in Table 1 and 60 g of toluene and 20 g of methanol as solvents and 4.0 g of dimethyl 2,2'-azobis(2-methyl propionate) as a polymerization initiator were further introduced. The acid value, Mw, Tg and triboelectric charge quantity of the CCR18 obtained were each measured in the same manner as in Example 1. The results are shown in Table 2. An image formation test was also conducted in the same manner as in Example 1 to evaluate of images of the cyan toner containing the CCR18 and to evaluate fog. The results are shown in Table 3.

Comparative Example 1

Production of CCR19

CCR19 was obtained in the same manner as in Example 1 except that styrene and N-isopropylacrylamide (A2) were introduced in the amounts shown in Table 1 and acrylic-acid dimer (C2) was not used. The acid value, Mw, Tg and triboelectric charge quantity of the CCR19 obtained were each measured in the same manner as in Example 1. The results are shown in Table 2. An image formation test was also conducted in the same manner as in Example 1 to evaluate images of the cyan toner containing the CCR19 and to evaluate fog. The results are shown in Table 3.

Comparative Example 2

Production of CCR20

CCR20 was obtained in the same manner as in Example 1 except that styrene and acrylic-acid dimer (C2) were introduced in the amounts shown in Table 1 and N-acryloylmorpholine (A1) was not used. The acid value, Mw, Tg and triboelectric charge quantity of the CCR20 obtained were each measured in the same manner as in Example 1. The results are shown in Table 2. An image formation test was also conducted in the same manner as in Example 1 to evaluate images of the cyan toner containing the CCR20 and to evaluate fog. The results are shown in Table 3.

Comparative Example 3

Production of CCR21

CCR21 was obtained in the same manner as in Example 1 except that styrene and succinic-acid monohydroxyethyl methacrylate (C5) were introduced in the amounts shown in Table 1 and N-acryloylmorpholine (A1) was not used. The acid value, Mw, Tg and triboelectric charge quantity of the CCR21 obtained were each measured in the same manner as in Example 1. The results are shown in Table 2. An image formation test was also conducted in the same manner as in Example 1 to evaluate images of the cyan toner containing the CCR21 and to evaluate fog. The results are shown in Table 3.

TABLE 1

| | | Monomer | | | Other vinyl monomers | | |
| | | (A) | | (C) | | | Vinyl |
| | Type | Amt. (g) | Type | Amt. (g) | Styrene (g) | 2-EHA (g) | toluene (g) |
|---|---|---|---|---|---|---|---|
| Example: | | | | | | | |
| 1 CCR1 | A1 | 5.0 | C2 | 7.0 | 88.0 | — | — |
| 2 CCR2 | A1 | 1.0 | C2 | 7.0 | 92.0 | — | — |
| 3 CCR3 | A1 | 15.0 | C2 | 7.0 | 78.0 | — | — |
| 4 CCR4 | A2 | 5.0 | C3 | 2.0 | 93.0 | — | — |
| 5 CCR5 | A2 | 5.0 | C3 | 5.0 | 90.0 | — | — |
| 6 CCR6 | A2 | 5.0 | C3 | 15.0 | 80.0 | — | — |
| 7 CCR7 | A2 | 5.0 | C3 | 20.0 | 75.0 | — | — |
| 8 CCR8 | A3 | 7.0 | C1 | 4.0 | 54.0 | 35.0 | — |
| 9 CCR9 | A3 | 7.0 | C1 | 4.0 | 74.0 | 15.0 | — |
| 10 CCR10 | A3 | 7.0 | C1 | 4.0 | 89.0 | — | — |
| 11 CCR11 | A3 | 7.0 | C1 | 4.0 | — | — | 89.0 |
| 12 CCR12 | A4 | 5.0 | C2 | 5.5 | 89.5 | — | — |
| 13 CCR13 | A4 | 5.0 | C2 | 5.5 | 89.5 | — | — |
| 14 CCR14 | A4 | 5.0 | C2 | 5.5 | 85.0 | — | — |
| 15 CCR15 | A4 | 5.0 | C2 | 5.5 | 85.0 | — | — |
| 16 CCR16 | A4 | 5.0 | C2 | 5.5 | 89.5 | — | — |
| 17 CCR17 | A5 | 5.0 | C4 | 9.5 | 85.5 | — | — |
| 18 CCR18 | A1 | 5.0 | C5 | 8.3 | 86.7 | — | — |
| Comparative Example | | | | | | | |
| 1 CCR19 | A2 | 5.0 | — | — | 95.0 | — | — |
| 2 CCR20 | — | — | C2 | 7.0 | 93.0 | — | — |
| 3 CCR21 | — | — | C5 | 8.3 | 91.7 | — | — |

2-EHA: 2-Ethylhexyl acrylate
Amt: Amount

TABLE 2

| | Acid value (mg · KOH/g) | Mw | Tg (° C.) | Triboelectric charge quantity (mC/kg) |
|---|---|---|---|---|
| Example: | | | | |
| 1 | 26.1 | 1,120 | 85.1 | −48.6 |
| 2 | 25.8 | 9,500 | 81.5 | −34.2 |
| 3 | 25.2 | 10,500 | 88.2 | −30.6 |
| 4 | 5.1 | 21,300 | 95.2 | −28.4 |
| 5 | 12.4 | 20,800 | 94.1 | −47.8 |
| 6 | 36.9 | 23,100 | 85.3 | −53.2 |
| 7 | 49.8 | 19,400 | 78.5 | −59.4 |
| 8 | 28.6 | 21,100 | 42.1 | −48.5 |
| 9 | 28.5 | 23,500 | 67.5 | −47.6 |
| 10 | 28.1 | 23,100 | 95.2 | −49.2 |
| 11 | 28.7 | 25,900 | 108.1 | −48.1 |
| 12 | 20.1 | 4,100 | 76.5 | −45.3 |
| 13 | 19.8 | 8,800 | 87.5 | −46.2 |
| 14 | 20.0 | 21,000 | 89.3 | −45.9 |
| 15 | 19.4 | 45,200 | 90.1 | −44.6 |
| 16 | 19.7 | 197,200 | 91.3 | −45.2 |
| 17 | 20.2 | 10,200 | 83.5 | −49.9 |
| 18 | 18.8 | 10,500 | 83.0 | −51.0 |
| Comparative Example: | | | | |
| 1 | 0 | 23,100 | 72.6 | −11.1 |
| 2 | 24.8 | 13,200 | 75.9 | −24.6 |
| 3 | 19.8 | 10,200 | 79.9 | −34.6 |

TABLE 3

| | Image density | | Fog | |
| | Initial stage | After running | Initial stage | After running |
|---|---|---|---|---|
| Example: | | | | |
| 1 | A | A | A | A |
| 2 | A | A | B | A |
| 3 | B | B | A | A |
| 4 | B | B | B | B |
| 5 | A | A | A | A |
| 6 | A | B | A | B |
| 7 | A | B | B | B |
| 8 | A | A | C | B |
| 9 | A | A | A | A |
| 10 | A | A | A | A |
| 11 | A | A | B | A |
| 12 | A | A | C | C |
| 13 | A | A | A | A |
| 14 | A | A | A | A |

TABLE 3-continued

|  | Image density | | Fog | |
| --- | --- | --- | --- | --- |
|  | Initial stage | After running | Initial stage | After running |
| 15 | A | A | B | A |
| 16 | A | A | C | B |
| 17 | A | A | A | A |
| 18 | A | A | A | A |
| Comparative Example: | | | | |
| 1 | D | D | C | C |
| 2 | C | B | C | C |
| 3 | C | B | C | C |

Example 19

Production of Negative-Chargeability Control Resin (CCR22)

Into a four-necked separable flask having a stirrer, a condenser, a thermometer and a nitrogen feed pipe, styrene, vinyl 2-ethylhexanoate (B2) and acrylic-acid dimer (C2) were introduced in the amounts shown in Table 4. Then, 60 g of toluene and 20 g of methanol as solvents and 4.0 g of 2,2'-azobis(2-methylbutyronitrile) as a polymerization initiator were further introduced thereinto, followed by stirring to carry out solution polymerization under the feeding of nitrogen and in the state of reflux. Thereafter, the product obtained was dried under reduced pressure to obtain a negative-chargeability control resin CCR22.

The acid value, Mw, Tg and triboelectric charge quantity of the CCR22 obtained were each measured in the same manner as in Example 1. The results are shown in Table 5. An image formation test was also conducted in the same manner as in Example 1 to evaluate images of the cyan toner containing the CCR22 and to evaluate fog. The results are shown in Table 6.

Examples 20 and 21

Production of CCR23 and CCR24

CCR23 and CCR24 were obtained in the same manner as in Example 19 except that the styrene and the vinyl 2-ethylhexanoate (B2) were introduced in the amounts changed as shown in Table 5. The acid value, Mw, Tg and triboelectric charge quantity of the CCR23 and CCR24 obtained were each measured in the same manner as in Example 19. The results are shown in Table 5. Image formation tests were also conducted in the same manner as in Example 19 to evaluate images of the cyan toner containing the CCR23 or CCR24 and to evaluate fog. The results are shown in Table 6.

Example 22

Production of CCR25

CCR25 was obtained in the same manner as in Example 19 except that styrene, vinyl benzoate (B3) and succinic-acid monohydroxyethyl acrylate (C3) were introduced in the amounts shown in Table 4 and dimethyl 2,2'-azobis (2-methyl propionate) was used in an amount of 3.1 g. The acid value, Mw, Tg and triboelectric charge quantity of the CCR25 obtained were each measured in the same manner as in Example 19. The results are shown in Table 5. An image formation test was also conducted in the same manner as in Example 19 to evaluate images of the cyan toner containing the CCR25 and to evaluate fog. The results are shown in Table 6.

Examples 23 to 25

Production of CCR26 to CCR28

CCR26 to CCR28 were obtained in the same manner as in Example 22 except that the styrene and the succinic-acid monohydroxyethyl acrylate (C3) were introduced in the amounts changed as shown in Table 4. The acid value, Mw, Tg and triboelectric charge quantity of the CCR26 to CCR28 obtained were each measured in the same manner as in Example 19. The results are shown in Table 5. Image formation tests were also conducted in the same manner as in Example 19 to evaluate images of the cyan toner containing the CCR26, CCR27 or CCR28 and to evaluate fog. The results are shown in Table 6.

Examples 26 and 27

Production of CCR29 and CCR30

CCR29 and CCR30 were obtained in the same manner as in Example 22 except that styrene, 2-ethylhexyl acrylate, vinyl monochloroacetate (B4) and acrylic acid (C1) were introduced in the amounts shown in Table 4. The acid value, Mw, Tg and triboelectric charge quantity of the CCR29 and CCR30 obtained were each measured in the same manner as in Example 19. The results are shown in Table 5. Image formation tests were also conducted in the same manner as in Example 19 to evaluate images of the cyan toner containing the CCR29 or CCR30 and to evaluate fog. The results are shown in Table 6.

Example 28

Production of CCR31

CCR31 was obtained in the same manner as in Example 19 except that styrene, vinyl monochloroacetate (B4) and acrylic acid (C1) were introduced in the amounts shown in Table 4. The acid value, Mw, Tg and triboelectric charge quantity of the CCR31 obtained were each measured in the same manner as in Example 19. The results are shown in Table 5. An image formation test was also conducted in the same manner as in Example 19 to evaluate images of the cyan toner containing the CCR31 and to evaluate fog. The results are shown in Table 6.

Example 29

Production of CCR32

CCR32 was obtained in the same manner as in Example 22 except that vinyltoluene, vinyl monochloroacetate (B4) and acrylic acid (C1) as a carboxyl-group-containing vinyl monomer were introduced in the amounts shown in Table 4. The acid value, Mw, Tg and triboelectric charge quantity of the CCR32 obtained were each measured in the same manner as in Example 19. The results are shown in Table 5. An image formation test was also conducted in the same manner as in Example 19 to evaluate images of the cyan toner containing the CCR32 and to evaluate fog. The results are shown in Table 6.

Example 30

Production of CCR33

CCR33 was obtained in the same manner as in Example 19 except that styrene, vinyl butyrate (B1) and acrylic-acid dimer (C2) were introduced in the amounts shown in Table 4 and 2,2'-azobis(2-methyl propionate) was used in an amount of 12.5 g. The acid value, Mw, Tg and triboelectric charge quantity of the CCR33 obtained were each measured in the same manner as in Example 19. The results are shown in Table 5. An image formation test was also conducted in the same manner as in Example 19 to evaluate images of the cyan toner containing the CCR33 and evaluate fog. The results are shown in Table 6.

Example 31

Production of CCR34

CCR34 was obtained in the same manner as in Example 19 except that styrene, vinyl butyrate (B1) and acrylic-acid dimer (C2) were introduced in the amounts shown in Table 4 and 2,2'-azobis(2-methyl propionate) was used in an amount of 4.5 g. The acid value, Mw, Tg and triboelectric charge quantity of the CCR34 obtained were each measured in the same manner as in Example 19. The results are shown in Table 5. An image formation test was also conducted in the same manner as in Example 19 to evaluate images of the cyan toner containing the CCR34 and to evaluate fog. The results are shown in Table 6.

Example 32

Production of CCR35

CCR35 was obtained in the same manner as in Example 19 except that styrene, vinyl butyrate (B1) and acrylic-acid dimer (C2) as a carboxyl-group-containing vinyl monomer were introduced in the amounts shown in Table 4 and 2,2'-azobis(2-methyl propionate) was used in an amount of 3.1 g. The acid value, Mw, Tg and triboelectric charge quantity of the CCR35 obtained were each measured in the same manner as in Example 19. The results are shown in Table 5. An image formation test was also conducted in the same manner as in Example 19 to evaluate images of the cyan toner containing the CCR35 and to evaluate fog. The results are shown in Table 6.

Example 33

Production of CCR36

CCR36 was obtained in the same manner as in Example 19 except that styrene, vinyl butyrate (B1) and acrylic-acid dimer (C2) were introduced in the amounts shown in Table 4 and 2,2'-azobis(2-methyl propionate) was used in an amount of 2.0 g. The acid value, Mw, Tg and triboelectric charge quantity of the CCR36 obtained were each measured in the same manner as in Example 19. The results are shown in Table 5. An image formation test was also conducted in the same manner as in Example 19 to evaluate images of the cyan toner containing the CCR36 and to evaluate fog. The results are shown in Table 6.

Example 34

Production of CCR37

Into a four-necked separable flask having a stirrer, a condenser, a thermometer and a nitrogen feed pipe, styrene, vinyl butyrate (B1) and acrylic-acid dimer (C2) were introduced in the amounts shown in Table 4 and further 0.7 g of benzoyl peroxide was added and dissolved. An aqueous solution composed of 3 g of tricalcium phosphate, 0.3 g of sodium lauryl sulfate and 210 g of deionized water was added to carry out stirring and granulation. After the granulation, the system was heated to 80° C. with stirring to carry out polymerization reaction for 6 hours, and thereafter heated to 90° C. to carry out polymerization reaction for 4 hours. Thereafter, filtration, water washing, acid washing and water washing were carried out, followed by drying to obtain CCR37.

The acid value, Mw, Tg and triboelectric charge quantity of the CCR37 obtained were each measured in the same manner as in Example 19. The results are shown in Table 5. An image formation test was also conducted in the same manner as in Example 19 to evaluate images of the cyan toner containing the CCR37 and to evaluate fog. The results are shown in Table 6.

Example 35

Production of CCR38

CCR38 was obtained in the same manner as in Example 19 except that styrene, vinyl pivarate (B5) and phthalic-acid monohydroxyethyl methacrylate (C4) were introduced in the amounts shown in Table 4. The acid value, Mw, Tg and triboelectric charge quantity of the CCR38 obtained were each measured in the same manner as in Example 19. The results are shown in Table 5.

An image formation test test was conducted in the same manner as the test in Example 19 except that the Phthalocyanine Blue was changed for carbon-black, to evaluate images of a black toner containing the CCR38 and to evaluate fog. The results are shown in Table 6.

Comparative Example 4

Production of CCR39

CCR39 was obtained in the same manner as in Example 19 except that styrene and vinyl 2-ethylhexanoate (B2) were introduced in the amounts shown in Table 4 and acrylic-acid dimer (C2) was not used. The acid value, Mw, Tg and triboelectric charge quantity of the CCR39 obtained were each measured in the same manner as in Example 19. The results are shown in Table 5. An image formation test was also conducted in the same manner as in Example 19 to evaluate images of the cyan toner containing the CCR39 and to evaluate fog. The results are shown in Table 6.

Comparative Example 5

Production of CCR40

CCR40 was obtained in the same manner as in Example 19 except that styrene and succinic-acid monohydroxyethyl acrylate (C3) were introduced in the amounts shown in Table 4 and vinyl 2-ethylhexanoate (B2) was not used. The acid value, Mw, Tg and triboelectric charge quantity of the CCR40 obtained were each measured in the same manner as in Example 19. The results are shown in Table 5. An image formation test was also conducted in the same manner as in Example 19 to evaluate images of the cyan toner containing the CCR40 and to evaluate fog. The results are shown in Table 6.

TABLE 4

| | | Monomer | | | Other vinyl monomers | | |
|---|---|---|---|---|---|---|---|
| | | (B) | | (C) | | | Vinyl |
| | | Type | Amt. (g) | Type | Amt. (g) | Styrene (g) | 2-EHA (g) | toluene (g) |

| Example: | | | | | | | | |
|---|---|---|---|---|---|---|---|---|
| 19 | CCR22 | B2 | 5.0 | C2 | 5.0 | 90.0 | — | — |
| 20 | CCR23 | B2 | 1.0 | C2 | 9.0 | 90.0 | — | — |
| 21 | CCR24 | B2 | 15.0 | C2 | 5.0 | 80.0 | — | — |
| 22 | CCR25 | B3 | 5.0 | C3 | 2.0 | 93.0 | — | — |
| 23 | CCR26 | B3 | 5.0 | C3 | 5.0 | 90.0 | — | — |
| 24 | CCR27 | B3 | 5.0 | C3 | 14.0 | 81.0 | — | — |
| 25 | CCR28 | B3 | 5.0 | C3 | 18.0 | 77.0 | — | — |
| 26 | CCR29 | B4 | 7.0 | C1 | 3.0 | 55.0 | 35.0 | — |

TABLE 4-continued

|  |  | Monomer | | | | Other vinyl monomers | | |
|---|---|---|---|---|---|---|---|---|
|  |  | (B) | | (C) | | | | Vinyl |
|  |  | Type | Amt. (g) | Type | Amt. (g) | Styrene (g) | 2-EHA (g) | toluene (g) |
| 27 | CCR30 | B4 | 7.0 | C1 | 3.0 | 75.0 | 15.0 | — |
| 28 | CCR31 | B4 | 7.0 | C1 | 3.0 | 90.0 | — | — |
| 29 | CCR32 | B4 | 7.0 | C1 | 3.0 | — | — | 90.0 |
| 30 | CCR33 | B1 | 6.0 | C2 | 6.0 | 88.0 | — | — |
| 31 | CCR34 | B1 | 6.0 | C2 | 6.0 | 88.0 | — | — |
| 32 | CCR35 | B1 | 6.0 | C2 | 6.0 | 88.0 | — | — |
| 33 | CCR36 | B1 | 6.0 | C2 | 6.0 | 88.0 | — | — |
| 34 | CCR37 | B1 | 6.0 | C2 | 6.0 | 88.0 | — | — |
| 35 | CCR38 | B5 | 5.0 | C4 | 10.0 | 85.0 | — | — |
| Comparative Example: | | | | | | | | |
| 4 | CCR39 | B3 | 5.0 | — | — | 95.0 | — | — |
| 5 | CCR40 | — | — | C3 | 8.0 | 92.0 | — | — |

2-EHA: 2-Ethylhexyl acrylate
Amt: Amount

TABLE 5

| | Acid value (mg · KOH/g) | Mw | Tg (° C.) | Triboelectric charge quantity (mC/kg) |
|---|---|---|---|---|
| Example: | | | | |
| 19 | 17.9 | 31,800 | 80.2 | −47.6 |
| 20 | 29.7 | 29,300 | 82.2 | −40.2 |
| 21 | 17.4 | 30,500 | 76.5 | −32.7 |
| 22 | 5.1 | 38,000 | 75.1 | −28.6 |
| 23 | 11.9 | 32,600 | 74.1 | −49.8 |
| 24 | 34.1 | 33,100 | 66.3 | −53.4 |
| 25 | 44.7 | 29,400 | 62.5 | −59.7 |
| 26 | 22.4 | 39,100 | 53.1 | −49.5 |
| 27 | 22.7 | 38,500 | 57.4 | −47.5 |
| 28 | 23.6 | 37,900 | 85.2 | −50.2 |
| 29 | 24.5 | 39,300 | 98.9 | −49.1 |
| 30 | 20.7 | 4,300 | 66.4 | −45.5 |
| 31 | 21.5 | 8,700 | 77.5 | −46.1 |
| 32 | 22.2 | 38,600 | 79.2 | −45.9 |
| 33 | 22.0 | 48,200 | 80.1 | −45.6 |
| 34 | 21.3 | 195,200 | 82.3 | −44.2 |
| 35 | 19.6 | 29,200 | 73.5 | −51.8 |
| Comparative Example: | | | | |
| 4 | 0 | 32,700 | 62.6 | −10.7 |
| 5 | 19.9 | 30,200 | 69.9 | −35.6 |

TABLE 6

| | Image density | | Fog | |
|---|---|---|---|---|
| | Initial stage | After running | Initial stage | After running |
| Example: | | | | |
| 19 | A | A | A | A |
| 20 | A | A | B | A |
| 21 | B | B | A | A |
| 22 | B | B | B | B |
| 23 | A | A | A | A |
| 24 | A | B | A | B |
| 25 | A | B | B | B |
| 26 | A | A | C | B |
| 27 | A | A | A | A |
| 28 | A | A | A | A |
| 29 | A | A | B | A |
| 30 | A | A | C | C |
| 31 | A | A | A | A |
| 32 | A | A | A | A |
| 33 | A | A | B | A |
| 34 | A | A | C | B |
| 35 | A | A | A | A |
| Comparative Example: | | | | |
| 4 | D | D | C | C |
| 5 | C | B | C | C |

What is claimed is:

1. A negative-chargeability control resin comprising a vinyl copolymer having a glass transition temperature Tg from 30° C. to 120° C. obtained by copolymerizing a monomer composition which contains at least a vinyl monomer represented by the following formula (1) or (2) and a vinyl monomer having as a functional group a carboxyl group or a carboxyl group made into salt structure:

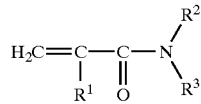

(1)

wherein $R^1$ represents a hydrogen atom or a methyl group; and $R^2$ and $R^3$ each represent a hydrogen atom or an alkyl group having 1 to 20 carbon atoms which can be substituted with a substituent except for an acid group, or $R^2$ and $R^3$ may combine chemically to form a heterocyclic ring having 4 to 20 carbon atoms, or $R^2$ and $R^3$ may form a cyclic structure having at least one atom selected from the group consisting of a nitrogen atom, an oxygen atom and a sulfur atom and having 4 to 19 carbon atoms; or

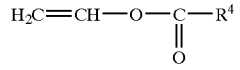

(2)

wherein $R^4$ represents an alkyl group having 1 to 20 carbon atoms, or an aromatic group.

2. The negative-chargeability control resin according to claim 1, wherein said vinyl copolymer contains monomer units derived from the vinyl monomer represented by the formula (1) or (2), in an amount of from 0.5% by weight to 20% by weight.

3. The negative-chargeability control resin according to claim 1, wherein said vinyl copolymer contains monomer units derived from the vinyl monomer represented by the formula (1) or (2), in an amount of from 2% by weight to 10% by weight.

4. The negative-chargeability control resin according to claim 1, wherein said vinyl copolymer contains, as a copolymerization component, monomer units derived from the vinyl monomer represented by the following formula (3) or (4):

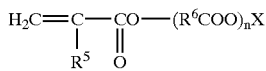

(3)

wherein $R^5$ represents a hydrogen atom or a methyl group; $R^6$ represents an alkylene group having 2 to 6 carbon atoms; n represents an integer of 0 to 10; and X represents a hydrogen atom, an alkali metal, an alkaline earth metal or a quaternary ammonium group; or

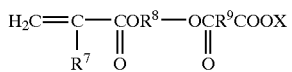

(4)

wherein $R^7$ represents a hydrogen atom or a methyl group; $R^8$ represents an alkylene group having 2 to 4 carbon atoms; $R^9$ represents an ethylene group, a vinylene group or a 1,2-cyclohexylene group; and X represents a hydrogen atom, an alkali metal, an alkaline earth metal or a quaternary ammonium group.

5. The negative-chargeability control resin according to claim 4, wherein said vinyl copolymer contains the monomer units derived from the vinyl monomer represented by the formula (3) or (4), as a copolymerization component in an amount of from 1% by weight to 20% by weight.

6. The negative-chargeability control resin according to claim 4, wherein said vinyl copolymer contains the monomer units derived from the vinyl monomer represented by the formula (3) or (4), as a copolymerization component in an amount of from 3% by weight to 10% by weight.

7. The negative-chargeability control resin according to claim 1, wherein said vinyl copolymer has a weight-average molecular weight Mw of from 2,000 to 200,000.

8. The negative-chargeability control resin according to claim 1, wherein said vinyl copolymer has a weight-average molecular weight Mw of from 8,000 to 50,000.

9. The negative-chargeability control resin according to claim 1, wherein said vinyl copolymer has a glass transition temperature Tg of from 60° C. to 100° C.

10. The negative-chargeability control resin according to claim 1, wherein said vinyl copolymer has an acid value of from 1 mg·KOH/g to 70 mg·KOH/g.

11. The negative-chargeability control resin according to claim 1, wherein said vinyl copolymer has an acid value of from 10 mg·KOH/g to 40 mg·KOH/g.

* * * * *